US012039916B2

(12) United States Patent
Cho et al.

(10) Patent No.: US 12,039,916 B2
(45) Date of Patent: Jul. 16, 2024

(54) DISPLAY DEVICE AND DRIVING METHOD THEREOF

(71) Applicant: Samsung Display Co., LTD., Yongin-si (KR)

(72) Inventors: Eui Myeong Cho, Yongin-si (KR); Ho Cheol Kang, Yongin-si (KR); Jae Hyun Koh, Yongin-si (KR); Seok Young Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/061,101

(22) Filed: Dec. 2, 2022

(65) Prior Publication Data

US 2023/0215346 A1 Jul. 6, 2023

(30) Foreign Application Priority Data

Dec. 30, 2021 (KR) ........................ 10-2021-0193063

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0842* (2013.01); *G09G 2310/08* (2013.01); *G09G 2320/0233* (2013.01); *G09G 2320/0257* (2013.01); *G09G 2320/0276* (2013.01);
(Continued)

(58) Field of Classification Search
CPC ... G09G 2300/0426; G09G 2300/0819; G09G 2300/0842; G09G 2310/08; G09G 2320/0233; G09G 2320/0257; G09G 2320/0276; G09G 2320/0285; G09G 2320/029; G09G 2320/045; G09G 2320/0673; G09G 2360/16; G09G 3/32; G09G 3/3208
See application file for complete search history.

(56) References Cited

U.S. PATENT DOCUMENTS 8,836,691 B2 9/2014 Ryu et al.
9,576,533 B2 2/2017 Kumeta et al.
(Continued)

FOREIGN PATENT DOCUMENTS

KR 10-2138590 B1 7/2020
KR 10-2282302 B1 7/2021

*Primary Examiner* — Kenneth Bukowski
(74) *Attorney, Agent, or Firm* — Lewis Roca Rothgerber Christie LLP

(57) ABSTRACT

A display device includes: pixels, each of the pixels including at least one light emitting element and a first transistor configured to supply a driving current to the at least one light emitting element; a sensing unit configured to sense a driving current of the first transistor, which corresponds to a data voltage applied to one pixel from among the pixels, the sensing unit being configured to detect a luminance of the light emitting element, which corresponds to the driving current; a gamma calculator configured to receive the driving current and the luminance of the light emitting element from the sensing unit, to calculate a gamma changed based on the driving current and the luminance of the light emitting element, and to provide, to a memory, the gamma changed based on the driving current and the luminance of the light emitting element.

20 Claims, 12 Drawing Sheets

(52) U.S. Cl.
CPC ................. *G09G 2320/045* (2013.01); *G09G 2320/0673* (2013.01); *G09G 2360/16* (2013.01)

(56) References Cited

U.S. PATENT DOCUMENTS

| | | | | |
|---|---|---|---|---|
| 2006/0284802 | A1* | 12/2006 | Kohno | G09G 3/3225<br>345/76 |
| 2016/0118022 | A1* | 4/2016 | Chun | G09G 3/2007<br>345/690 |
| 2020/0251045 | A1* | 8/2020 | An | H02H 1/0007 |
| 2021/0225272 | A1* | 7/2021 | Yang | G09G 3/2092 |

* cited by examiner

DISPLAY DEVICE AND DRIVING METHOD THEREOF

CROSS-REFERENCE TO RELATED APPLICATION

This application claims priority to and the benefit of Korean Patent Application No. 10-2021-0193063 filed on Dec. 30, 2021 in the Korean Intellectual Property Office, the entire disclosure of which is incorporated by reference herein.

BACKGROUND

1. Field

The present disclosure generally relates to a display device and a driving method thereof.

2. Description of Related Art

As interest in information displays and demand for portable information media increase, research and commercialization has focused on display devices.

SUMMARY

One or more embodiments provide a display device capable of decreasing the visibility of a luminance change, and a driving method of the display device.

In accordance with an aspect of the present disclosure, there is provided a display device including: pixels, each of the pixels including at least one light emitting element and a first transistor configured to supply a driving current to the at least one light emitting element; a sensing unit configured to sense a driving current of the first transistor, which corresponds to a data voltage applied to one pixel from among the pixels, the sensing unit being configured to detect a luminance of the light emitting element, which corresponds to the driving current; a gamma calculator configured to receive the driving current and the luminance of the light emitting element from the sensing unit, to calculate a gamma changed based on the driving current and the luminance of the light emitting element, and to provide, to a memory, the gamma changed based on the driving current and the luminance of the light emitting element; the memory configured to update and store a gain corrected corresponding to the changed gamma received from the gamma calculator; and a luminance compensator configured to generate compensated image data by applying the corrected gain to a grayscale value of input image data.

The gamma calculator is configured to identify a relationship between the data voltage and the luminance of the light emitting element from a relationship between the data voltage and the driving current and a relationship between the driving current and the luminance of the light emitting element.

The gamma calculator is configured to calculate the changed gamma based on the relationship between the data voltage and the luminance of the light emitting element from a relationship between a data voltage and a luminance with respect to a gamma.

The gamma calculator is configured to derive a relationship between the data voltage and the luminance, and is configured to calculate a gamma corresponding to the relationship as the changed gamma.

The corrected gain may be a value that allow a luminance variation with respect to time to be constant.

The corrected gain is a proportional relation with the luminance of the light emitting element.

The display device may further include a data driver configured to supply a data voltage corresponding to the compensated image data to the pixels.

Each of the pixels may further include: a second transistor including a first electrode connected to a data line to which the data voltage is applied, a second electrode connected to a first node, and a gate electrode connected to a scan line; a third transistor including a first electrode connected to a sensing line connected to the sensing unit, a second electrode connected to a second node, and a gate electrode connected to a control line; and a storage capacitor connected between the first node and the second node. The first transistor may include a first electrode connected to a first driving voltage, a second electrode connected to the second node, and a gate electrode connected to the first node.

The driving current may be supplied to the light emitting element through the first transistor, based on a voltage at the first node.

The at least one light emitting element may include: a first semiconductor layer; a second semiconductor layer different from the first semiconductor layer; and an active layer located between the first semiconductor layer and the second semiconductor layer.

In accordance with an aspect of the present disclosure, there is provided a method of driving a display device including pixels, each of the pixels including at least one light emitting element and a first transistor supplying a driving current to the at least one light emitting element, the method including: sensing a driving current of the first transistor, which corresponds to a data voltage applied to one pixel from among the pixels, and detecting a luminance of the light emitting element, which corresponds to the driving current; calculating a gamma changed based on the driving current and the luminance of the light emitting element; updating and storing a gain corrected corresponding to the changed gamma; and generating compensated image data by applying the corrected gain to a grayscale value of input image data.

The calculating of the changed gamma may include identifying a relationship between the data voltage and the luminance of the light emitting element from a relationship between the data voltage and the driving current and a relationship between the driving current and the luminance of the light emitting element.

The calculating of the changed gamma may include calculating the changed gamma through the relationship between the data voltage and the luminance of the light emitting element from a relationship between a data voltage and a luminance with respect to a gamma.

The calculating of the changed gamma may include deriving a relationship between the data voltage and the luminance, and calculating a gamma corresponding to the relationship as the changed gamma.

The corrected gain may be a value that allow a luminance variation with respect to time to be constant.

The corrected gain is proportional to the luminance of the light emitting element.

The method may further include supplying a data voltage corresponding to the compensated image data to the pixels.

Each of the pixels may further include: a second transistor including a first electrode connected to a data line to which the data voltage is applied, a second electrode connected to a first node, and a gate electrode connected to a scan line; a third transistor including a first electrode connected to a sensing line, a second electrode connected to a second node, and a gate electrode connected to a control line; and a storage capacitor connected between the first node and the second node. The first transistor may include a first electrode connected to a first driving voltage, a second electrode connected to the second node, and a gate electrode connected to the first node.

The driving current may be supplied to the light emitting element through the first transistor, based on the voltage at the first node.

The at least one light emitting element may include: a first semiconductor layer; a second semiconductor layer different from the first semiconductor layer; and an active layer located between the first semiconductor layer and the second semiconductor layer.

BRIEF DESCRIPTION OF THE DRAWINGS

One or more embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The present disclosure may apply various changes and different shape, therefore only illustrate in details with particular examples. However, the examples do not limit to certain shapes but apply to all the change and equivalent material and replacement. The drawings included are illustrated in a fashion where the figures are expanded for the better understanding.

It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Hereinafter, a display device in accordance with one or more embodiments of the present disclosure will be described in detail with reference to the accompanying drawings.

Figure 1:
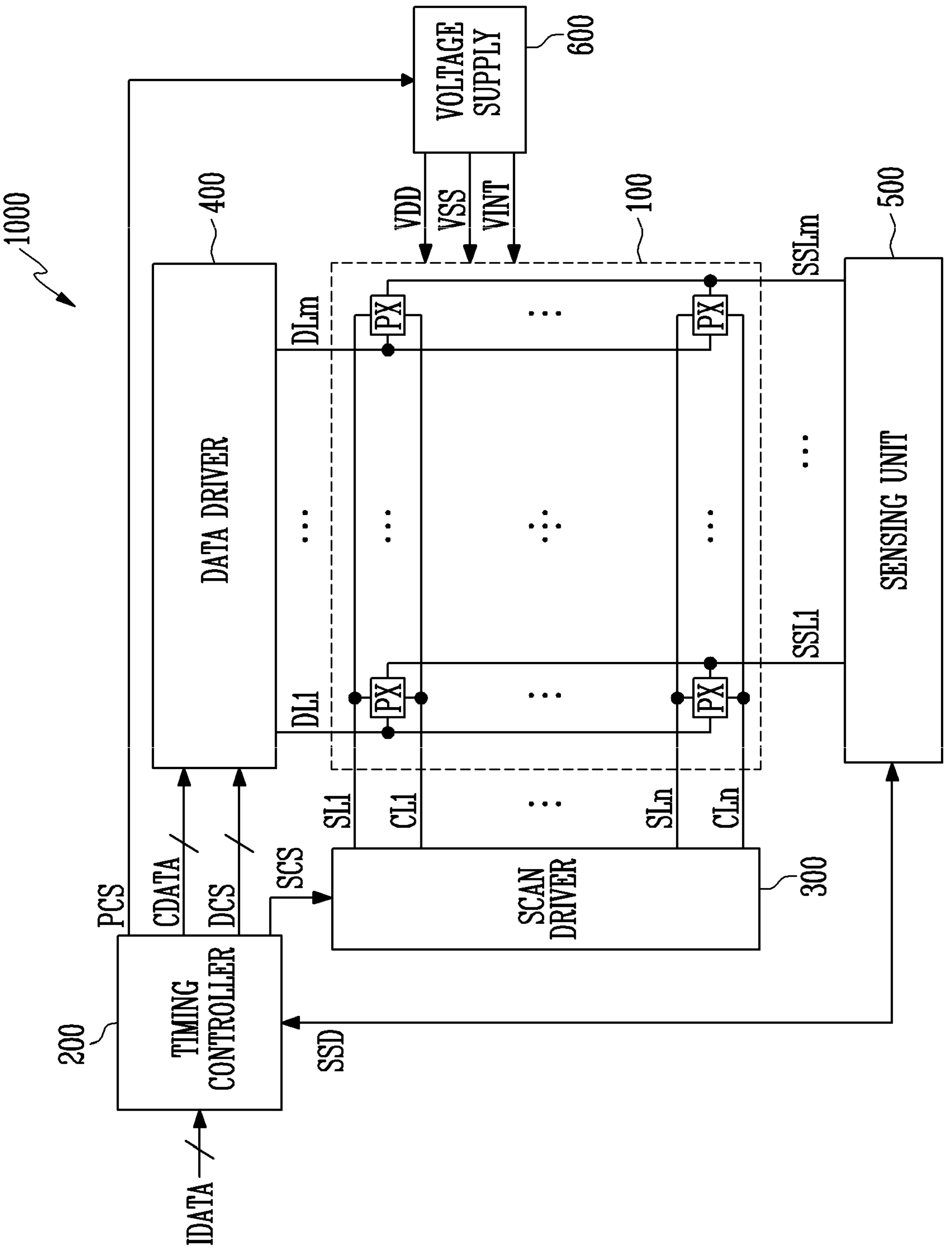
FIG. 1 is a block diagram illustrating a display device in accordance with one or more embodiments of the present disclosure.

FIG. 1 is a block diagram illustrating a display device in accordance with one or more embodiments of the present disclosure.

Referring to FIG. 1, the display device 1000 may include a pixel unit 100, a timing controller 200, a scan driver 300, a data driver 400, a sensing unit 500, and a voltage supply 600.

The display device 1000 may be a flat panel display device, a flexible display device, a curved display device, a foldable display device, or a bendable display device. Also, the display device 1000 may be applied to a transparent display device, a head-mounted display device, a wearable display device, and the like. Also, the display device 1000 may be applied to various electronic devices including a smartphone, a tablet, a smart pad, a TV, a monitor, and the like.

In one or more embodiments, the display device 1000 may be driven, including a display period for displaying an image and a sensing period for sensing characteristics of a driving transistor and a light emitting element, which are included in each of pixels PX.

The pixel unit 100 includes pixels PX respectively connected to data lines DL1 to DLm (m is a natural number), scan lines SL1 to SLn (n is a natural number), control lines CL1 to CLn, and sensing lines SSL1 to SSLm. The pixels PX may be supplied with a first driving voltage VDD, a second driving voltage VSS, and an initialization voltage VINT from the voltage supply 600 which will be described later. Although n scan lines SL1 to SLn are illustrated in FIG. 1, the present disclosure is not limited thereto. In an example, at least one control line, at least one scan line, at least one emission control line, at least one sensing line, and/or the like may be additionally formed corresponding to a circuit structure of the pixel PX.

The timing controller 200 may generate a data driving control signal DCS, a scan driving control signal SCS, and a power driving control signal PCS, corresponding to synchronization signals supplied from the outside. The scan driving control signal SCS generated by the timing controller 200 may be supplied to the scan driver 300, the data driving control signal DCS generated by the timing controller 200 may be supplied to the data driver 400, and the power driving control signal PCS generated by the timing controller 200 may be supplied to the voltage supply 600.

A scan start signal, a control start signal, and clock signals may be included in the scan driving control signal SCS. The scan start signal may control a timing of a scan signal. The control start signal may control a timing of a control signal. The clock signals may be used to shift the scan start signal and/or the control start signal.

A source start signal and clock signals may be included in the data driving control signal DCS. The source start signal may control a sampling start time of data. The clock signals may be used to control a sampling operation.

The power driving control signal PCS may control supply and voltage levels of the first driving voltage VDD, the second driving voltage VSS, and the initialization voltage VINT.

The timing controller 200 may control an operation of the sensing unit 500. For example, the timing controller 200 may control a timing at which the initialization voltage VINT is supplied to the pixels PX through the sensing lines SSL1 to SSLm and/or a timing at which a current generated in the pixel PX is sensed through the sensing lines SSL1 to SSLm.

The timing controller 200 may generate a compensation value for compensating for a characteristic value of the pixels PX, based on sensing data SSD provided from the sensing unit 500. For example, the timing controller 200 may compensate for input image data DATA by reflecting a threshold voltage change and a mobility change of the driving transistor included in the pixel PX, a characteristic change of the light emitting element included in the pixel PX, and the like. In one or more embodiments, the sensing data SSD may include a driving current (or driving current value) of the driving transistor and a luminance (or luminance value) of the light emitting element.

The timing controller 200 may update a gamma (e.g., a predetermined gamma) into a changed gamma, based on the sensing data SSD, and update a gain corrected corresponding to the changed gamma. Also, the timing controller 200 may generate compensated image data CDATA by reflecting the corrected gain to a grayscale value of the input image data DATA.

The timing controller 200 may supply the generated compensated image data CDATA to the data driver 400. The input image data IDATA and the compensated image data CDATA may include grayscale value information included in a set grayscale value range.

In one or more embodiments, the timing controller 200 may generate compensated image data CDATA such that a luminance change rate can be constantly changed by calculating a changed gamma, using sensing values for external compensation, updating a gamma (e.g., a predetermined gamma) stored in a lookup table to the changed gamma, and correcting a gain, corresponding to the changed gamma. Thus, the possibility that a luminance change of the display device will be viewed can be decreased. The timing controller 200 will be described in detail hereinafter.

The scan driver 300 may receive the scan driving control signal SCS from the timing controller 200. The scan driver 300 supplied with the scan driving control signal SCS may supply a scan signal to the scan lines SL1 to SLn, and supply a control signal to the control lines CL1 to CLn.

In an example, the scan driver 300 may sequentially supply the scan signal to the scan lines SL1 to SLn. When the scan signal is sequentially supplied to the scan lines SL1 to SLn, the pixels PX may be selected in units of horizontal lines. To this end, the scan signal may be set to a gate-on voltage (e.g., a logic high level) at which transistors included in the pixels PX can be turned on.

Similarly, the scan driver 300 may supply the control signal to the control lines CL1 to CLn. The control signal may be used to sense (or extract) a driving current flowing in the pixel PX (i.e., a current flowing through the driving transistor). Timings at which the scan signal and the control signal are supplied and waveforms of the scan signal and the control signal may be differently set according to the display period and the sensing period.

Although a case where one scan driver 300 outputs both the scan signal and the control signal is illustrated in FIG. 1, the present disclosure is not limited thereto. For example, the scan driver 300 may include a first scan driver that supplies the scan signal to the pixel unit 100 and a second scan driver that supplies the control signal to the pixel unit 100.

The data driver 400 may be supplied with the data driving control signal DCS from the timing controller 200. In the sensing period, the data driver 400 may supply a data signal (e.g., a sensing data signal) for pixel characteristic detection to the pixel unit 100. In the display period, the data driver 400 may supply a data signal (e.g., an image data signal) for image display to the pixel unit 100, based on the compensated image data CDATA.

The sensing unit 500 may supply a reference voltage (e.g., a predetermined reference voltage) for image display to the pixel unit 100 through the sensing lines SSL1 to SSLm. Also, the sensing unit 500 may sense a characteristic of the driving transistor or characteristic information of the light emitting element from the pixel PX. For example, the sensing unit 500 may sense a driving current of the driving transistor, which corresponds to a data voltage (or data voltage corresponding to the compensated image data CDATA) applied to the pixel PX, and detect a luminance of the light emitting element, which corresponds to the corresponding driving current.

Although a case where the sensing unit 500 is a component separate from the timing controller 200 is illustrated in FIG. 1, at least a portion of the sensing unit 500 may be included in the timing controller 200. For example, the sensing unit 500 and the timing controller 200 may be formed as one driving IC. Further, the data driver 400 may also be included in the timing controller 200. Therefore, at least a portion of the sensing unit 500, the data driver 400, and the timing controller 200 may be formed as one driving IC.

The voltage supply 600 may supply the first driving voltage VDD, the second driving voltage VSS, and the initialization voltage VINT to the pixel unit 100, based on the power driving control signal PCS. In one or more embodiments, the first driving voltage VDD may determine a voltage (e.g., a drain voltage) of a first electrode of the driving transistor, and the second driving voltage VSS may determine a cathode voltage of the light emitting element LD. In addition, the initialization voltage VINT may provide a reference voltage (e.g., a predetermined reference voltage) at which a characteristic of the driving transistor can be sensed in the sensing period.

Hereinafter, the pixel included in the display device in accordance with one or more embodiments of the present disclosure will be described with reference to FIG. 2.

Figure 2:
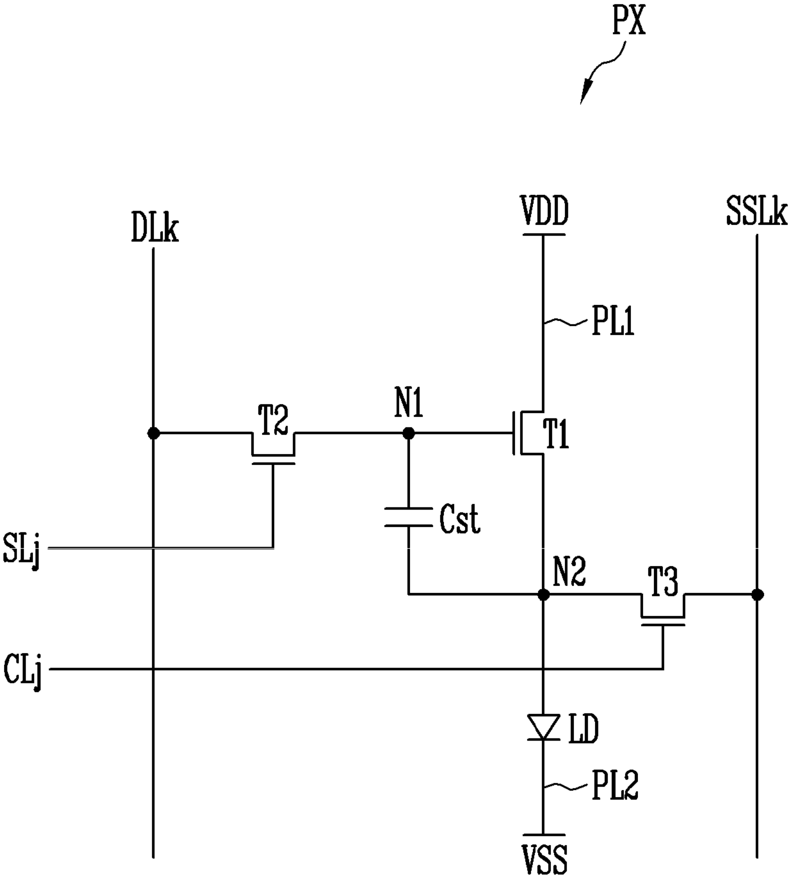
FIG. 2 is a circuit diagram illustrating an example of a pixel included in the display device shown in FIG. 1.

FIG. 2 is a circuit diagram illustrating an example of the pixel included in the display device shown in FIG. 1. For convenience of description, a pixel PX that is located at a jth row (horizontal line) and a kth column is illustrated in FIG. 2.

Referring to FIG. 2, the pixel PX may include a light emitting element LD, a first transistor T1 (e.g., a driving transistor), a second transistor T2 (e.g., a switching transistor), a third transistor T3 (e.g., an initialization transistor), and a storage capacitor Cst.

A first electrode (e.g., an anode or a cathode electrode) of the light emitting element LD may be connected to a second node N2, and a second electrode (e.g., the cathode or the anode electrode) of the light emitting element LD may be connected to the second driving voltage VSS through a second power line PL2. The light emitting element LD may generate light with a luminance (e.g., a predetermined luminance) corresponding to an amount of current supplied from the first transistor T1.

A first electrode of the first transistor T1 may be connected to the first driving voltage VDD through a first power line PL1, and a second electrode of the first transistor T1 may be connected to the first electrode of the light emitting element LD. A gate electrode of the first transistor T1 may be connected to a first node N1. The first transistor T1 may control an amount of current flowing through the light emitting element LD, corresponding to a voltage of the first node N1.

A first electrode of the second transistor T2 may be connected to a data line DLk, and a second electrode of the second transistor T2 may be connected to the first node N1. A gate electrode of the second transistor T2 may be connected to a scan line SLj. The second transistor T2 may be turned on when a scan signal is supplied to the scan line SLj, to transfer a data signal from the data line DLk to the first node N1.

The third transistor T3 may be connected between a sensing line SSLk and the second electrode of the first transistor T1 (i.e., the second node N2). That is, a first electrode of the third transistor T3 may be connected to the sensing line SSLk, a second electrode of the third transistor T3 may be connected to the second electrode of the first transistor T1, and a gate electrode of the third transistor T3 may be connected to a control line CLj. The third transistor T3 may be turned on when a control signal is supplied to the control line CLj, to electrically connect the sensing line SSLk and the second node N2 (i.e., the second electrode of the first transistor T1) to each other.

In one or more embodiments, when the third transistor T3 is turned on, the initialization voltage VINT may be supplied to the second node N2. In one or more embodiments, when the third transistor T3 is turned on, a current generated from the first transistor T1 may be supplied to the sensing unit 500 (see FIG. 1).

The storage capacitor Cst may be connected between the first node N1 and the second node N2. The storage capacitor Cst may store a voltage (or a charge) corresponding to a voltage difference between the first node N1 and the second node N2.

However, according to embodiments of the present disclosure, the circuit structure of the pixel PX is not limited by FIG. 2. In an example, the light emitting element LD may be located between the first power line PL1 and the first electrode of the first transistor T1. In addition, a parasitic capacitor may be formed between the gate electrode of the first transistor T1 (i.e., the first node N1) and a drain electrode of the first transistor T1.

Although a case where the transistors T1, T2, and T3 are implemented with an NMOS transistor is illustrated in FIG. 2, the present disclosure is not limited thereto. In an example, at least one of the transistors T1, T2, and T3 may be implemented with a PMOS transistor. In addition, the transistors T1, T2, and T3 shown in FIG. 2 may be implemented with a thin film transistor (TFT) including at least one of an oxide semiconductor, an amorphous silicon semiconductor, and a polycrystalline silicon semiconductor.

Hereinafter, a configuration of the display device in accordance with an embodiment of the present disclosure will be described in detail with reference to FIGS. 3 to 8.

Figure 3:
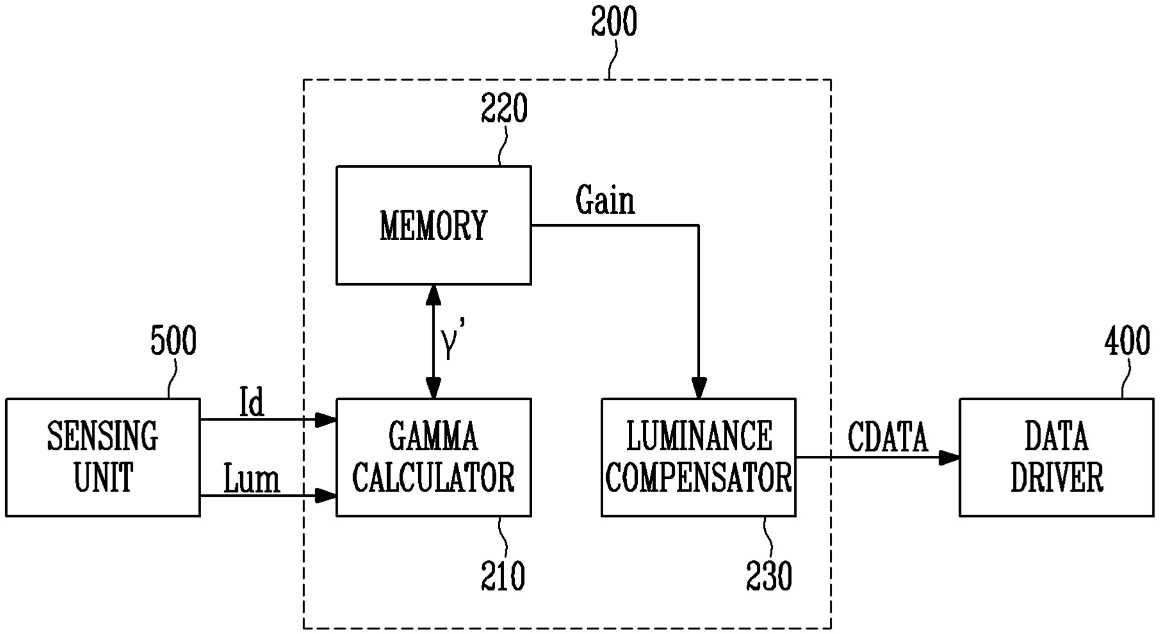
FIG. 3 is a diagram illustrating a detailed configuration included in a timing controller, a sensing unit, and a data driver in accordance with one or more embodiments of the present disclosure.
Figure 4:
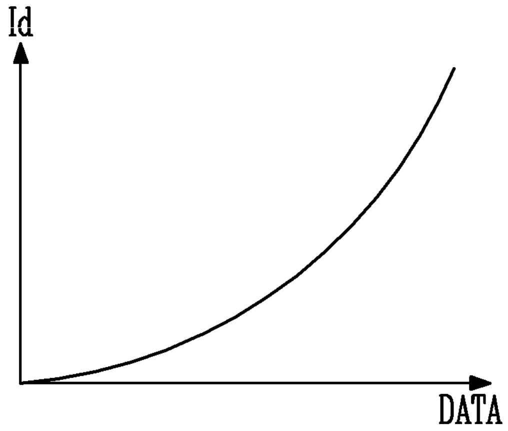
FIG. 4 is a graph illustrating a relationship between a data voltage applied to the pixel voltage and a driving current in accordance with one or more embodiments of the present disclosure.
Figure 5:
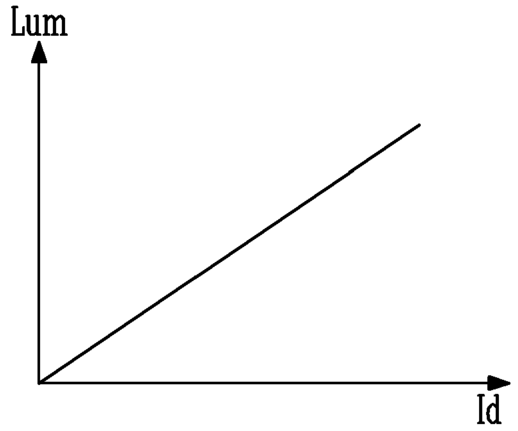
FIG. 5 is a graph illustrating a relationship between a data voltage applied to the pixel voltage and a luminance in accordance with one or more embodiments of the present disclosure.
Figure 6:
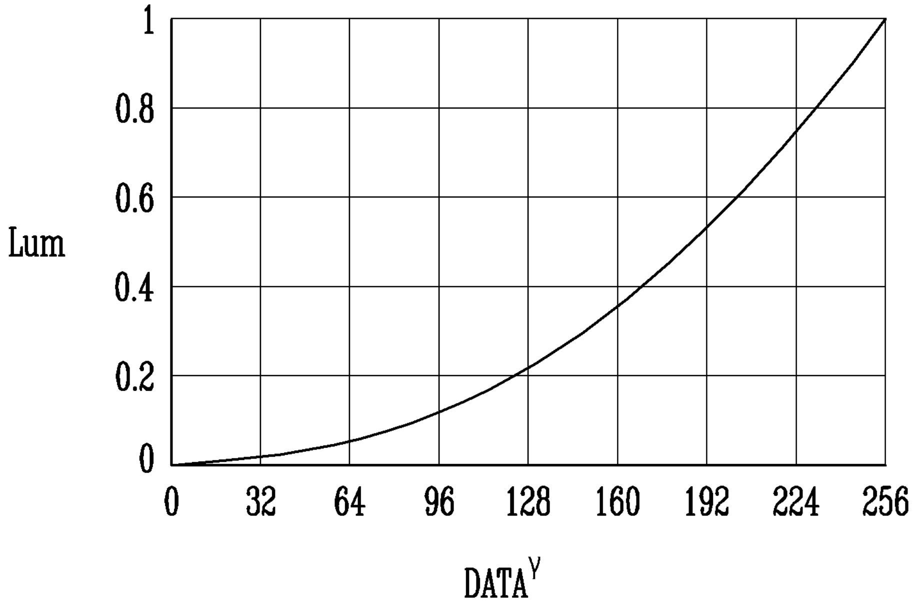
FIG. 6 is a graph illustrating a relationship between a luminance and a data voltage to which a gamma (e.g., a predetermined gamma) has been applied in accordance with one or more embodiments of the present disclosure.
Figure 7:
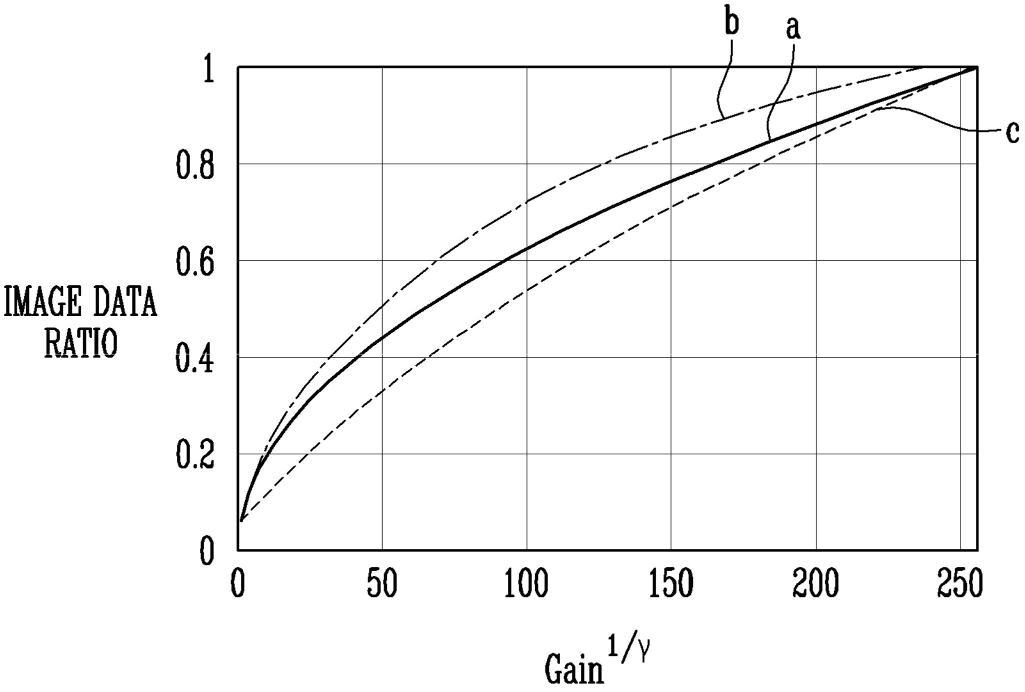
FIG. 7 is a graph illustrating a relationship between gain and a data voltage in the pixel in accordance with one or more embodiments of the present disclosure.
Figure 8:
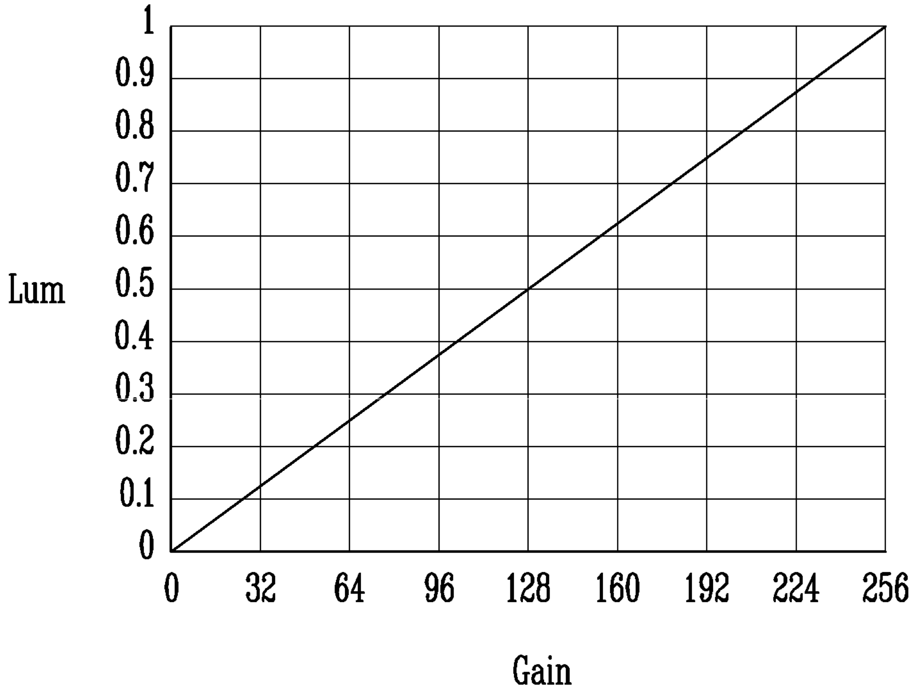
FIG. 8 is a graph illustrating a relationship between gain and a luminance in the pixel in accordance with one or more embodiments of the present disclosure.

FIG. 3 is a diagram illustrating a detailed configuration included in the timing controller, and the sensing unit and the data driver in accordance with one or more embodiments of the present disclosure. FIG. 4 is a graph illustrating a relationship between a data voltage applied to a pixel voltage and a driving current in accordance with one or more embodiments of the present disclosure. FIG. 5 is a graph illustrating a relationship between a data voltage applied to a pixel voltage and a luminance in accordance with one or more embodiments of the present disclosure. FIG. 6 is a graph illustrating a relationship between a data voltage to which a gamma (e.g., a predetermined gamma) has been applied and a luminance in accordance with one or more embodiments of the present disclosure. FIG. 7 is a graph illustrating a relationship between gain and a data voltage in a pixel in accordance with one or more embodiments of the present disclosure. FIG. 8 is a graph illustrating a relationship between gain and a luminance in the pixel in accordance with one or more embodiments of the present disclosure.

The sensing unit 500 may sense a driving current Id of the first transistor T1, which corresponds to a data voltage applied to the pixel PX, and detect a luminance (or luminance value) of the light emitting element LD, which corresponds to the corresponding driving current Id. The luminance corresponding to the driving current Id may be a value pre-stored in a lookup table included in the sensing unit 500.

Referring to FIG. 3, the timing controller 200 in accordance with one or more embodiments of the present disclosure may include a gamma calculator 210, a memory 220, and a luminance compensator 230.

The gamma calculator 210 may receive a driving current (e.g., a driving current value) and a luminance (e.g., a luminance value) from the sensing unit 500, and identify a relationship between a data voltage and a luminance from a relationship between a data voltage and a driving current and a relationship between a driving current and a luminance. For example, referring to FIG. 4, driving current Id value according to change in data voltage DATA is represented. The magnitude of the driving current Id output from the first transistor T1 may gradually increase as the magnitude of the data voltage DATA increases. After sometime, for example, when a suitable time elapses (e.g., a predetermined time elapses), the magnitude of the driving current Id may be saturated. It can be seen that the data voltage DATA and the driving current Id in a pixel PX have a proportional relation (e.g., a predetermined proportional relation). For example, in a pixel PX, the change in data voltage DATA is proportional to the change in driving current Id. In addition, referring to FIG. 5, luminance value Lum according to (e.g., with respect to) change in driving current Id is represented. The luminance value Lum may gradually increase as the magnitude of the driving current Id increases. It can be seen that the luminance value Lum and the driving current Id in the pixel PX have a proportional relation (e.g., a predetermined proportional relation). For example, in the pixel PX, the change in the luminance value Lum is proportional to the change in driving current Id.

Accordingly, the gamma calculator 210 may identify a relationship between a data voltage DATA and a luminance value Lum, based on the driving current Id (e.g., the driving current value) and the luminance (e.g., the luminance value). The driving current Id value has a proportional relation (e.g., a predetermined proportional relation) with the data voltage DATA, and the luminance value Lum has a proportional relation (e.g., a predetermined proportional relation) with the driving current Id. Therefore, the luminance value Lum according to the data voltage DATA in the pixel PX may have a proportional relation (e.g., a predetermined proportional relation). For example, in the pixel PX, the change in the luminance value Lum is proportional to the change in data voltage DATA.

The gamma calculator 210 may calculate a changed gamma through a relationship between a data voltage DATA and a luminance according degradation from a relationship between a data voltage and a luminance with respect to a predetermined gamma. In other words, the gamma calculator 210 may calculate a changed gamma based on the relationship between the data voltage DATA and luminance in view of the predetermined gamma using the relationship between the data voltage and luminance according to degradation.

For example, referring to FIG. 6, a relationship of a luminance according to data voltage DATA with respect to a gamma (e.g., a predetermined gamma) is represented. For example, FIG. 6 illustrates a change in luminance value Lum as the data voltage DATA changes for a predetermined gamma. The graph is generated with respect to when the predetermined gamma y is 2.2. The luminance value Lum may gradually increase as the data voltage DATA increases. That is, as inferred above, it can be seen that the luminance value Lum according to the data voltage DATA has a proportional relation (e.g., a predetermined proportional relation). In general, the luminance value Lum according to the data voltage DATA may have a proportional relation (e.g., a predetermined proportional relation). However, the luminance value Lum according to the data voltage may vary according to the changed gamma. Therefore, the gamma calculator 210 may derive a relationship (or graph) of data voltage and luminance according to sensing data, and a gamma corresponding to the corresponding relationship may be calculated as the changed gamma. For example, when the luminance is small with respect to the same voltage, a value greater than the predetermined gamma may be calculated. When the luminance is large with respect to the same voltage, a value smaller than the predetermined gamma may be calculated.

The gamma calculator 210 may provide the changed gamma to the memory 220.

The memory 220 may include a lookup table in which a gain corrected according to the gamma (e.g., the predetermined gamma) and a grayscale value corresponding to the gain are stored.

The memory 220 may update the gamma (e.g., the predetermined gamma) to the changed gamma by receiving the changed gamma, and newly store a gain corrected to the changed gamma and a grayscale value corresponding to the corrected gain.

For example, referring to FIG. 7, a ratio (e.g., an image data ratio) between a gain according to gamma and image data to which the gain is applied is represented. A ratio between a gain according to the predetermined gamma and image data is indicated by b, and a ratio between a gain according to a changed gamma and image data is indicated by a and c. In FIG. 7, the predetermined gamma and the changed gamma are indicated by y.

For example, when the changed gamma is greater than the predetermined gamma, the ratio of the image data according to the gain may further increase than the predetermined gamma. When the changed gamma is smaller than the predetermined gamma, the ratio of the image data according to the gain may further decrease than the predetermined gamma.

That is, the memory 220 may update the corrected gain according to the changed gamma, and newly store a grayscale value (e.g., image data) corresponding to the corrected gain. In one or more embodiments, the corrected gain may be a value for allowing a luminance variation according to time to become constant. In an example, when the corrected gain has a proportional relation with the luminance, the luminance variation according to time may become constant.

For example, referring to FIG. 8, a relationship of luminance Lum with respect to gain Gain is represented. The gain Gain may be applied to image data together with gamma correction, to change a luminance of the pixel unit 100 by changing a ratio of the image data. The luminance value Lum may gradually increase as the gain Gain increases. That is, the gain Gain and the luminance value Lum may correspond to a proportional relation (e.g., a predetermined proportional relation). For example, the change in the luminance value Lum is proportional to the change in the gain Gain.

The luminance compensator 230 may compensate for a luminance of input image data by reflecting a gain corrected according to a grayscale value of the input image data. For example, the luminance compensator 230 may adjust a grayscale value of the input image data to compensate for a luminance of input image data according to the gain corrected. The input image data may be referred to as compensated image data CDATA.

In one or more embodiments, the luminance compensator 230 may receive a desired gain (e.g., a predetermined gain) from an afterimage compensator. The luminance compensator 230 may compensate for the luminance of the input image data by using a gain corrected based on a desired gain (e.g., a predetermined gain). For example, an afterimage compensator may perform network power compensation capable of compensating for a load caused by power lines connected to the pixel unit 100 (see FIG. 1), image power compensation capable of varying compensation according to a still image or a moving image of the pixel unit 100, logo compensation capable of detecting and compensating for degradation occurring in a specific area of the pixel unit 100, area compensation capable of differently compensating for a central area and an outer area of the pixel unit, and the like. The afterimage compensator may provide a gain predetermined through these compensations to the luminance compensator 230.

In one or more embodiments, the corrected gain may be a value obtained by reflecting a gamma changed according to a characteristic of the driving transistor (e.g., T1) and a characteristic of the light emitting element LD, which are caused by degradation. Accordingly, a luminance change rate according to time can become constant even when degradation progresses, and thus the possibility that a luminance change of the display device will be viewed can be decreased.

Although a case where the memory 220 is included in the timing controller 200 is illustrated in FIG. 3, the present disclosure is not limited thereto. In one or more embodiments, the memory 220 may be implemented as a component separate from the timing controller 200.

Hereinafter, a driving method of the display device in accordance with one or more embodiments of the present disclosure will be described with reference to FIG. 9.

Figure 9:
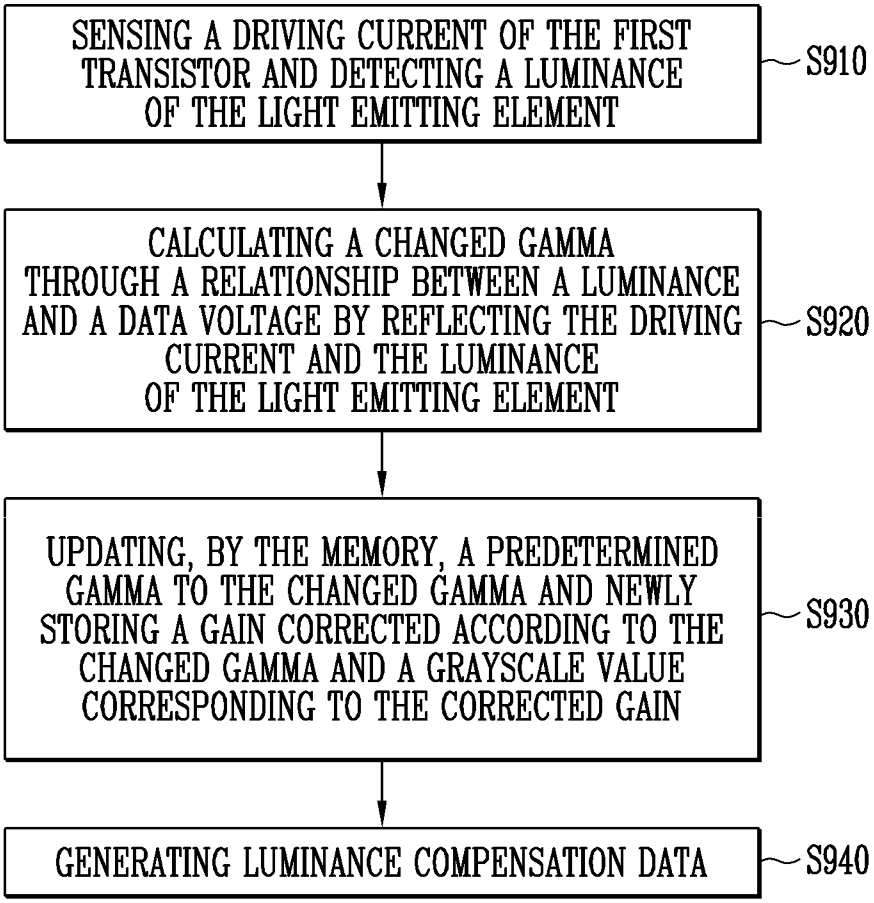
FIG. 9 is a flowchart illustrating a driving method of the display device in accordance with one or more embodiments of the present disclosure.

FIG. 9 is a flowchart illustrating a driving method of the display device in accordance with one or more embodiments of the present disclosure.

Referring to FIG. 9, the display device in accordance with one or more embodiments of the present disclosure may include step S910 of sensing a driving current (e.g., Id) of the first transistor (e.g., T1) and detecting a luminance of the light emitting element (e.g., LD), which corresponds to the corresponding driving current (e.g., Id), step S920 of calculating a changed gamma through a relationship between a luminance according to a data voltage DATA by reflecting (e.g., based on) the driving current Id and the luminance of the light emitting element LD, step S930 of updating, by the memory, a predetermined gamma to the changed gamma and newly storing a gain corrected according to the changed gamma and a grayscale value corresponding to the corrected gain, and step S940 of generating luminance compensation data (or compensated image data CDATA) to compensate for a luminance of input image data by reflecting (e.g., based on) the corrected gain by adjusting a grayscale value of the input image data.

The data driver 400 (see FIG. 1) may supply a data voltage corresponding to compensated image data to the pixels, and the pixels may emit light according to data on which degradation compensation and gamma compensation are performed according to the compensated image data CDATA.

In one or more embodiments, a changed gamma may be calculated by using sensing values for external compensation, and a gamma (e.g., a predetermined gamma) stored in the lookup table may be updated to the changed gamma.

Subsequently, the display device may generate compensated image data to which a corrected gain is reflected by changing an initial gain to the corrected gain, based on the changed gamma. The corrected gain may be a value reflected such that a luminance change rate can be constantly changed. Accordingly, a luminance change rate according to time can become constant even when degradation progresses, and thus the possibility that a luminance change of the display device will be viewed can be decreased. Consequently, the image quality of the display device can be improved.

Hereinafter, effects, aspects, and features of the display device in accordance with one or more embodiments of the present disclosure and a display device in accordance with a comparative example will be described with reference to FIGS. 10 and 11.

Figure 10:
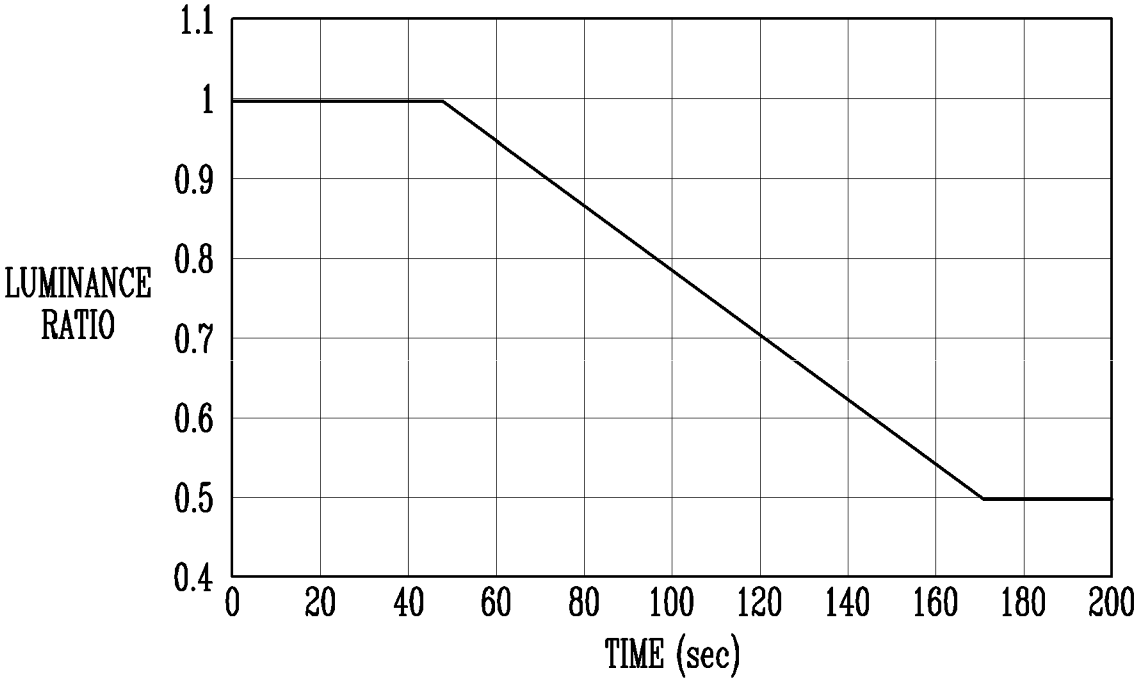
FIG. 10 is a graph illustrating luminance ratio according to time in the display device in accordance with one or more embodiments of the present disclosure.

FIG. 10 is a graph illustrating luminance ratio according to (e.g., with respect to) time in the display device in accordance with one or more embodiments of the present disclosure. FIG. 11 is a graph illustrating luminance ratio according to (e.g., with respect to) time in a display device in accordance with a comparative example.

Referring to FIG. 10, a luminance may decrease at a constant ratio during a desired period (e.g., a predetermined period) in the display device in accordance with one or more embodiments of the present disclosure. For example, the luminance of the display device may constantly decrease during a period of about 40 seconds to about 160 seconds. When a luminance variation according to time is constant, the possibility that a luminance change will be viewed in the display device may become low.

In one or more embodiments, a changed value may be calculated by using sensing values for external compensation, and a gamma (e.g., a predetermined gamma) stored in the lookup table may be updated to the changed gamma.

Subsequently, the display device may generate compensated image data to which a corrected gain is reflected by changing an initial gain to the corrected gain, based on the changed gamma. The corrected gain may be a value reflected such that a luminance change rate can be adjusted to be constant. Accordingly, a luminance change rate according to time can become constant even when degradation progresses, and thus the possibility that a luminance change of the display device will be viewed can be decreased. Consequently, the image quality of the display device can be improved.

On the other hand, when the luminance variation according to time is not constant, the possibility that a change in luminance will be viewed according to the luminance change in the display device may become high.

Figure 11:
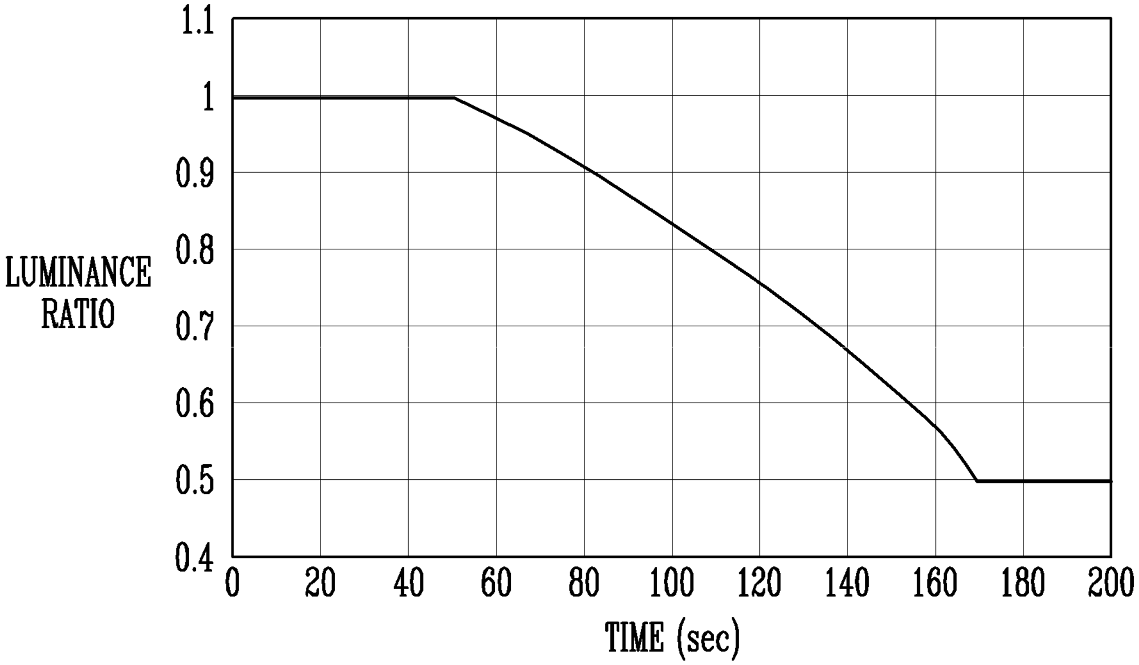
FIG. 11 is a graph illustrating luminance ratio according to time in a display device in accordance with a comparative example.

Referring to FIG. 11, a luminance change rate may not be constant during a desired period (e.g., a predetermined period) in the display device in accordance with the comparative example. For example, the luminance of the display device may not constantly decrease during the period of about 40 seconds to about 160 seconds. When a luminance variation according to time is not constant, the possibility that a change in luminance will be viewed according to the luminance change in the display device may become high, and the possibility that the light emitting element will be degraded may become high as time elapses.

Thus, compensated image data can be generated such that the luminance change rate can be constantly changed by calculating a changed gamma, using sensing values for external compensation, updating a gamma (e.g., a predetermined gamma) stored in a lookup table to the changed gamma, and correcting a gain, corresponding to the changed gamma. Accordingly, the possibility that a luminance change of the display device will be viewed can be decreased.

Hereinafter, a light emitting element in accordance with one or more embodiments of the present disclosure will be described with reference to FIG. 12.

Figure 12:
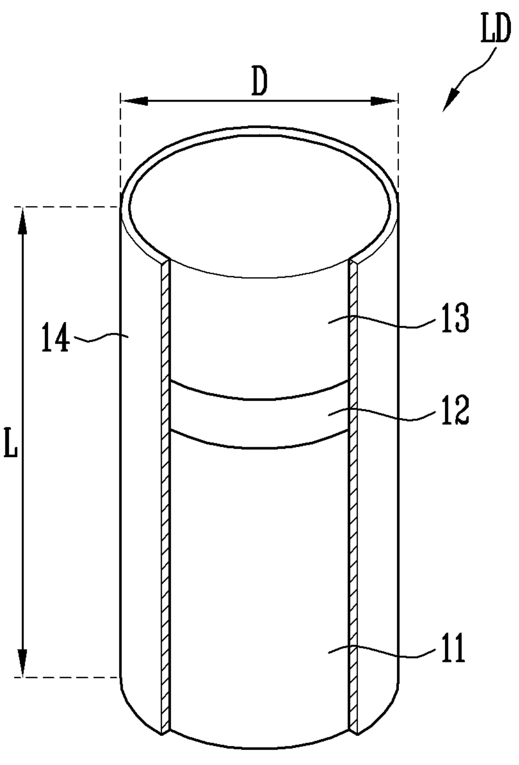
FIG. 12 is a perspective cutaway view illustrating a light emitting element included in the display device in accordance with one or more embodiments of the present disclosure.

FIG. 12 is a perspective cutaway view illustrating a light emitting element included in the display device in accordance with one or more embodiments of the present disclosure.

Referring to FIG. 12, the light emitting element LD included in the display device in accordance with one or more embodiments of the present disclosure includes a first semiconductor layer 11, a second semiconductor layer 13, and an active layer 12 located between the first semiconductor layer 11 and the second semiconductor layer 13. In an example, the light emitting element LD may be configured as a stack structure in which the first semiconductor layer 11, the active layer 12, and the third semiconductor layer 13 are sequentially stacked along a length L direction.

The light emitting element LD may be provided in a rod shape extending in one direction, i.e., a cylindrical shape. When assuming that an extending direction of the light emitting element LD is the length L direction, the light emitting element LD may have one end portion and the other end portion along the length L direction. Although a pillar-shaped light emitting element LD is illustrated in FIG. 12, the kind and/or shape of the light emitting element LD in accordance with the embodiment of the present disclosure is not limited thereto.

The first semiconductor layer 11 may include at least one n-type semiconductor layer. For example, the first semiconductor layer 11 may include any one semiconductor material from among InAlGaN, GaN, AlGaN, InGaN, AlN, and InN, and may be an n-type semiconductor layer doped with a first conductivity type dopant such as Si, Ge or Sn. However, the material constituting the first semiconductor layer 11 is not limited thereto. In addition, the first semiconductor layer 11 may be configured with various materials.

The active layer 12 is disposed on the first semiconductor layer 11, and may be formed in a single-quantum well structure or a multi-quantum well structure. In one or more embodiments, a clad layer doped with a conductive dopant may be formed on the top and/or the bottom of the active layer 12. In an example, the clad layer may be formed as an AlGaN layer or an InAlGaN layer. In one or more embodiments, a material such as AlGaN or AlInGaN may be used to form the active layer 12. In addition, the active layer 12 may be configured with various materials.

When a voltage equal to or higher than a threshold voltage is applied to both ends of the light emitting element LD, the light emitting element LD emits light as electron-hole pairs are combined in the active layer 12. The light emission of the light emitting element LD is controlled by using such a principle, so that the light emitting element LD can be used as a light source for various light emitting devices, including a pixel of a display device.

The second semiconductor layer 13 may be disposed on the active layer 12, and include a semiconductor layer of a type different from the type of the first semiconductor layer 11. In an example, the second semiconductor layer 13 may include at least one p-type semiconductor layer. For example, the second semiconductor layer 13 may include at least one semiconductor material from among InAlGaN, GaN, AlGaN, InGaN, AlN, and InN, and include a P-type semiconductor layer doped with a second conductivity type dopant such as Mg, Zn, Ca, Sr or Ba. However, the material constituting the second semiconductor layer 13 is not limited thereto. In addition, the second semiconductor layer 13 may be formed of various materials.

In the above-described embodiment, it is described that each of the first semiconductor layer 11 and the second semiconductor layer 13 is configured with one layer. However, the present disclosure is not limited thereto. In one or more embodiments of the present disclosure, each of the first semiconductor layer 11 and the second semiconductor layer 13 may further include at least one layer, e.g., a clad layer and/or a Tensile Strain Barrier Reducing (TSBR) layer according to the material of the active layer 12. The TSBR layer may be a strain reducing layer disposed between semiconductor layers having different lattice structures to perform a buffering function for reducing a lattice constant difference. The TSBR may be configured with a p-type semiconductor layer such as p-GAInP, p-AlInP or p-AlGaInP, but the present disclosure is not limited thereto.

In one or more embodiments, the light emitting element LD may further include an insulative layer 14 provided on a surface thereof. The insulative film 14 may be formed on the surface (e.g., an outer peripheral or circumferential surface) of the light emitting element LD to be around (e.g., surround) an outer surface (e.g., an outer peripheral or circumferential surface) of the active layer 12. In addition, the insulative film 14 may further surround one area of each of the first semiconductor layer 11 and the second semiconductor layer 13. However, in one or more embodiments, the insulative film 14 may expose both end portions of the light emitting element LD, which have different polarities. For example, the insulative film 14 does not cover one ends of the first semiconductor layer 11 and the second semiconductor layer 13, which are located at both ends of the light emitting element LD in the length L direction, e.g., two end surfaces of a cylinder (an upper surface and a lower surface of the light emitting element LD), but may expose the one ends of the first semiconductor layer 11 and the second semiconductor layer 13.

When the insulative film 14 is provided on the surface (e.g., the outer peripheral or circumferential surface) of the light emitting element LD, particularly, a surface of the active layer 12, the active layer 12 can be prevented from being short-circuited with at least one electrode (e.g., at least one contact electrode from among contact electrodes connected to both the ends of the light emitting element LD), etc. Accordingly, the electrical stability of the light emitting element LD can be ensured.

In addition, the light emitting element LD includes the insulative film 14 on the surface (e.g., the outer peripheral or circumferential surface) thereof, so that a surface defect of the light emitting element LD can be reduced or minimized, thereby improving the lifetime and efficiency of the light emitting element LD. Further, when each light emitting element LD includes the insulative film 14, an unwanted short circuit can be prevented from occurring between a plurality of light emitting elements LD even when the light emitting elements LD are densely disposed.

In one or more embodiments, the light emitting element LD may be manufactured through a surface treatment process. For example, when a plurality of light emitting elements LD are mixed in a liquid solution (or solvent) to be supplied to each emission area (e.g., an emission area of each pixel), each light emitting element LD may be surface-treated such that the light emitting elements LD are not unequally condensed in the solution but equally dispersed in the solution.

In one or more embodiments, the light emitting element LD may further include an additional component in addition to the first semiconductor layer 11, the active layer 12, the second semiconductor layer 13, and the insulative film 14. For example, the light emitting element LD may additionally include at least one phosphor layer, at least one active layer, at least one semiconductor layer, and/or at least one electrode layer, which are disposed at one ends of the first semiconductor layer 11, the active layer 12, and the second semiconductor layer 13.

The light emitting element LD may be used in various kinds of devices which require a light source, including a display device. For example, at least one light emitting element LD, e.g., a plurality of light emitting elements LD each having a size of nanometer scale to micrometer scale may be disposed in each pixel area of a display device, and a light source (e.g., a light source unit) of each pixel may be configured by using the light emitting elements LD. However, the application field of the light emitting element LD is not limited to the display device. For example, the light emitting element LD may be used in other types of devices that require a light source, such as a lighting device.

In accordance with the present disclosure, compensated image data can be generated such that a luminance change rate can be constantly changed by calculating a changed gamma, using sensing values for external compensation, updating a gamma (e.g., a predetermined gamma) stored in a lookup table to the changed gamma, and correcting a gain, corresponding to the changed gamma. Thus, the possibility that a luminance change of the display device will be viewed can be decreased.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

pixels, each of the pixels comprising at least one light emitting element and a first transistor configured to supply a driving current to the at least one light emitting element; and a driving integrated circuit (IC) comprising:

a sensing unit configured to sense the driving current of the first transistor, which corresponds to a data voltage applied to one pixel from among the pixels, the sensing unit being configured to detect a luminance of the light emitting element, which corresponds to the driving current;

a gamma calculator configured to receive the driving current and the luminance of the light emitting element from the sensing unit, to calculate a gamma changed based on the driving current and the luminance of the light emitting element, and to provide, to a memory, the gamma changed based on the driving current and the luminance of the light emitting element;

the memory configured to update a gain as a corrected gain corresponding to the changed gamma received from the gamma calculator and to store the corrected gain; and a luminance compensator configured to generate compensated image data by applying the corrected gain to a grayscale value of input image data.

2. The display device of claim 1, wherein the gamma calculator is configured to identify a relationship between the data voltage and the luminance of the light emitting element from a relationship between the data voltage and the driving current and a relationship between the driving current and the luminance of the light emitting element.

3. The display device of claim 2, wherein the gamma calculator is configured to calculate the changed gamma based on the relationship between the data voltage and the luminance of the light emitting element from a relationship between a data voltage and a luminance with respect to a gamma.

4. The display device of claim 2, wherein the gamma calculator is configured to derive the relationship between the data voltage and the luminance, and is configured to calculate a gamma corresponding to the relationship as the changed gamma.

5. The display device of claim 1, wherein the corrected gain is a value that allows a luminance variation with respect to time to be constant.

6. The display device of claim 5, wherein the corrected gain is proportional to the luminance of the light emitting element.

7. The display device of claim 1, further comprising a data driver configured to supply a data voltage corresponding to the compensated image data to the pixels.

8. The display device of claim 1, wherein each of the pixels further comprises:

a second transistor comprising a first electrode connected to a data line to which the data voltage is applied, a second electrode connected to a first node, and a gate electrode connected to a scan line;

a third transistor comprising a first electrode connected to a sensing line connected to the sensing unit, a second electrode connected to a second node, and a gate electrode connected to a control line; and a storage capacitor connected between the first node and the second node, and wherein the first transistor comprises a first electrode connected to a first driving voltage, a second electrode connected to the second node, and a gate electrode connected to the first node.

9. The display device of claim 8, wherein the driving current is supplied to the light emitting element through the first transistor, based on a voltage at the first node.

10. The display device of claim 1, wherein the at least one light emitting element comprises:

a first semiconductor layer;

a second semiconductor layer different from the first semiconductor layer; and an active layer located between the first semiconductor layer and the second semiconductor layer.

11. A method of driving a display device comprising pixels, each of the pixels comprising at least one light emitting element and a first transistor supplying a driving current to the at least one light emitting element, the method comprising:

sensing the driving current of the first transistor, which corresponds to a data voltage applied to one pixel from among the pixels, and detecting a luminance of the light emitting element, which corresponds to the driving current;

calculating a changed gamma based on the driving current and the luminance of the light emitting element;

updating a gain as a corrected gain corresponding to the changed gamma and storing the corrected gain; and generating compensated image data by applying the corrected gain to a grayscale value of input image data.

12. The method of claim 11, wherein the calculating of the changed gamma comprises identifying a relationship between the data voltage and the luminance of the light emitting element from a relationship between the data voltage and the driving current and a relationship between the driving current and the luminance of the light emitting element.

13. The method of claim 12, wherein the calculating of the changed gamma comprises calculating the changed gamma through the relationship between the data voltage and the luminance of the light emitting element from a relationship between a data voltage and a luminance with respect to a gamma.

14. The method of claim 12, wherein the calculating of the changed gamma comprises deriving the relationship between the data voltage and the luminance, and calculating a gamma corresponding to the relationship as the changed gamma.

15. The method of claim 11, wherein the corrected gain is a value that allows a luminance variation with respect to time to be constant.

16. The method of claim 15, wherein the corrected gain is proportional to the luminance of the light emitting element.

17. The method of claim 11, further comprising supplying a data voltage corresponding to the compensated image data to the pixels.

18. The method of claim 11, wherein each of the pixels further comprises:

a second transistor comprising a first electrode connected to a data line to which the data voltage is applied, a second electrode connected to a first node, and a gate electrode connected to a scan line;

a third transistor comprising a first electrode connected to a sensing line, a second electrode connected to a second node, and a gate electrode connected to a control line; and a storage capacitor connected between the first node and the second node, and wherein the first transistor comprises a first electrode connected to a first driving voltage, a second electrode connected to the second node, and a gate electrode connected to the first node.

19. The method of claim 18, wherein the driving current is supplied to the light emitting element through the first transistor, based on a voltage at the first node.

20. The method of claim 11, wherein the at least one light emitting element comprises:

a first semiconductor layer;

a second semiconductor layer different from the first semiconductor layer; and an active layer located between the first semiconductor layer and the second semiconductor layer.

* * * * *